(12) United States Patent
Kaminen et al.

(10) Patent No.: US 11,466,142 B2
(45) Date of Patent: Oct. 11, 2022

(54) CELLULOSE BASED COMPOSITION

(71) Applicant: Woodly Oy, Espoo (FI)

(72) Inventors: Jaakko Kaminen, Espoo (FI); Marko Parkkinen, Espoo (FI); Laura Kela, VTT (FI); Tommi Vuorinen, Tampere (FI); Harri Setälä, VTT (FI); Kari Kammiovirta, VTT (FI); Lisa Wikström, VTT (FI); Upi Anttila, Espoo (FI)

(73) Assignee: WOODLY OY, Espoo (FI)

( * ) Notice: Subject to any disclaimer, the term of this patent is extended or adjusted under 35 U.S.C. 154(b) by 0 days.

(21) Appl. No.: 16/623,308

(22) PCT Filed: Apr. 23, 2018

(86) PCT No.: PCT/EP2018/060316
§ 371 (c)(1),
(2) Date: Dec. 16, 2019

(87) PCT Pub. No.: WO2018/228744
PCT Pub. Date: Dec. 20, 2018

(65) Prior Publication Data
US 2020/0199332 A1    Jun. 25, 2020

(30) Foreign Application Priority Data
Jun. 15, 2017 (FI) ..................... 20175561

(51) Int. Cl.
| C08L 1/14 | (2006.01) |
| B65D 65/22 | (2006.01) |
| B65D 65/38 | (2006.01) |
| C08J 3/00 | (2006.01) |
| C08J 3/12 | (2006.01) |
| C08J 5/18 | (2006.01) |
| C08K 3/22 | (2006.01) |
| C08L 1/02 | (2006.01) |
| C08K 5/12 | (2006.01) |

(52) U.S. Cl.
CPC ............. C08L 1/14 (2013.01); B65D 65/22 (2013.01); B65D 65/38 (2013.01); C08J 3/005 (2013.01); C08J 3/12 (2013.01); C08J 5/18 (2013.01); C08K 3/22 (2013.01); C08L 1/02 (2013.01); C08J 2301/02 (2013.01); C08J 2301/14 (2013.01); C08K 5/12 (2013.01); C08K 2003/2241 (2013.01)

(58) Field of Classification Search
CPC .................. C08L 1/14; B65D 65/00
See application file for complete search history.

(56) References Cited

U.S. PATENT DOCUMENTS

| 3,332,899 | A | | 7/1967 | Cummings et al. |
| 3,422,042 | A | | 1/1969 | Porter et al. |
| 3,893,960 | A | | 7/1975 | Sheppard |
| 4,020,216 | A | * | 4/1977 | Miller ................. C08J 7/043 |
| | | | | 428/423.7 |
| 5,914,188 | A | * | 6/1999 | Kobayashi ............ C08J 7/0427 |
| | | | | 428/331 |
| 2002/0028857 | A1 | | 3/2002 | Holy |
| 2009/0018326 | A1 | * | 1/2009 | Hashimoto ............. B29C 41/28 |
| | | | | 536/56 |
| 2011/0152818 | A1 | * | 6/2011 | Wang ..................... C08L 1/26 |
| | | | | 604/385.23 |
| 2016/0297950 | A1 | | 10/2016 | Jing et al. |

FOREIGN PATENT DOCUMENTS

| CN | 103122079 | | 5/2013 |
| JP | 2008273197 | A | 11/2008 |
| JP | 2015533186 | A | 11/2015 |
| WO | 20140119657 | A1 | 8/2014 |

OTHER PUBLICATIONS

PCT/EP2018/060316, "International Search Report and Written Opinion", dated Jun. 28, 2018, 8 pages.
JP 2019-569280, "Notice of Reasons for Rejection" dated Feb. 22, 2022 (4 pages), with English Language Translation (5 pages).

* cited by examiner

*Primary Examiner* — Shaojia A Jiang
*Assistant Examiner* — Everett White
(74) *Attorney, Agent, or Firm* — Kilpatrick Townsend & Stockton LLP

(57) ABSTRACT

The present invention concerns a cellulose based composition for manufacturing a film or foil, which composition comprises at least one selected from the group consisting of cellulose acetate butyrate, cellulose acetate propionate and ethyl cellulose, together with tall oil fatty acid ester, as well as a manufacturing method thereof. The invention also concerns packaging film comprising the composition and use of the composition.

18 Claims, 1 Drawing Sheet

CELLULOSE BASED COMPOSITION

CROSS-REFERENCE TO RELATED APPLICATIONS

The present application is a U.S. national phase application under 35 U.S.C. § 371 of PCT/EP2018/060316, filed on Apr. 23, 2018, which claims the benefit of priority to FI Application No. 20175561, filed on Jun. 15, 2017, the entire contents of each of which are incorporated by reference herein for all purposes.

BACKGROUND OF THE INVENTION

The invention concerns a cellulose based composition for manufacturing a film or foil, use thereof, as well as a packaging film manufactured thereof, and a method for manufacturing a film or foil. Especially, the invention concerns a composition for manufacturing a film or foil, which composition comprises at least one polymer selected from the group consisting of cellulose acetate butyrate, cellulose acetate propionate and ethyl cellulose, and in addition tall oil fatty acid (TOFA) ester, wherein the molar mass of at least one of the polymers selected from the group consisting of cellulose acetate butyrate, cellulose acetate propionate and ethyl cellulose is above 20,000 Da.

BACKGROUND OF THE INVENTION

To ensure an environmentally sustainable development, plastic materials made from fossil raw materials, such as petroleum or natural gas, need to be replaced with new environmentally friendly materials. These new materials are often called bioplastics.

Several new synthetic bioplastic materials have been developed. These synthetic materials are not necessarily based on renewable resources, but have been made biodegradable in an artificial way. Bioplastics are thus commonly divided into two separate groups: natural and synthetic polymers. Natural polymers are based on biopolymers, for example proteins or polysaccharides (i.e. starch and cellulose). Synthetic biopolymers are for example aliphatic polyesters, polyanhydrides, polyortoesters, water soluble polyvinyl alcohols and certain polyurethanes. Biodegradable materials are typically defined as a mass that degrades in a reasonable time, either by bacterial enzyme activity or by hydrolytic degradation.

One large field, where raw materials from fossil sources are still used, is packing and wrapping materials such as plastic materials (polyethylene, polypropylene etc.). Plastic wrappings, such as films or foils, are one example of materials which typically are derived from petroleum based products or natural gas. Most household plastic wraps are made from polyethylene (PE), polyvinyl chloride (PVC), or polyvinylidene chloride (PVDC) derived from hydrocarbons. Films and foils made from plastic are used for a wide range of purposes. Some examples are cling films or other plastic wraps for packing food, plastic films for wrapping bales of hay etc. Such wrapping or packing materials need to be replaced with environmentally friendly alternatives.

Cellulose is a natural polymer and is considered a renewable resource. Known cellulose based materials are for example Cellophane, Celluloid, Transparit, Cellidor, and Cellblend. Cellulose based materials are typically biodegradable. However, many of these materials have not been considered economically feasible compared to petroleum based products. Thereto, they have had other disadvantages relating to processability etc. Cellulose acetate, cellulose acetobutyrate, benzyl cellulose, and ethyl cellulose, for example, need high DS to obtain melt processability. Thermoplasticity and biodegradability are not always compatible.

Although some new bioplastics have been developed to replace petroleum based plastic materials, there is still a constant need for finding new sustainable solutions to ensure a sustainable development and to alleviate waste problems related to packaging materials and plastics. Especially, there is a need to develop materials with clingy properties to replace traditional cling films, such as LDPE cling films.

SUMMARY OF THE INVENTION

The objective of the invention is to achieve a solution to the above-mentioned problems. Especially, the objective of the invention is to bring forth a cellulose based composition, which can be used to manufacture films or foils. The new cellulose based composition could replace films or foils based on fossil raw materials, and which are used as packing or wrapping materials. Thus, the cellulose based composition and films or foils manufactured therefrom provide a more sustainable packing material option for grocers and consumers.

The objectives of the invention are accomplished with a composition having the characteristics as mentioned in the independent claims. The preferred embodiments of the invention are presented in the independent claims. One objective of the invention is thus to provide a cellulose based composition for manufacturing a film or foil. The cellulose based composition according to the invention comprises at least one of the cellulose based polymers selected from the group consisting of: cellulose acetate butyrate, cellulose acetate propionate and ethyl cellulose, and in addition tall oil fatty acid ester, wherein the molar mass of at least one of the polymers selected from the group consisting of cellulose acetate butyrate, cellulose acetate propionate and ethyl cellulose is above 20,000 Da. The present invention also concerns a packaging film, which comprises the cellulose based composition according to the invention.

In addition to the new composition and packaging film, the present invention concerns a method for manufacturing a film or foil. The method according to the invention comprises the following steps:
  melt mixing a composition comprising at least one of the polymers selected from the group consisting of cellulose acetate butyrate, cellulose acetate propionate and ethyl cellulose, and tall oil fatty acid ester, to obtain a homogenous mixture, ester, to obtain a homogenous mixture, wherein optionally, tall oil fatty acid ester is added to the polymer(s) in at least two steps,
  granulating the homogenous mixture to obtain a granulated raw material, and
  producing a film or foil material from said granulated raw material.

The present invention concerns also use of the cellulose based composition according to the invention for the manufacture of a packaging film. Also the invention concerns use of the cellulose based composition according to the invention in a film blowing process.

The invention is based on the surprising finding that an environmentally friendly composition for manufacturing a film or foil can be prepared from a mixture comprising at least one of the cellulose based polymers selected from the group consisting of cellulose acetate butyrate, cellulose acetate propionate and ethyl cellulose, together with tall oil fatty acid ester. The obtained composition can be formed into a packaging film or foil with clingy properties.

One advantage with the composition according to the invention is that it can be processed in conventional machines, which are now used to manufacture and process plastic films. Thus, no expensive apparatus investments need to be made.

SHORT DESCRIPTION OF THE FIGURES

In the following, the invention is illustrated more closely by FIGURE referring to the enclosed FIG. 1, which shows an example of a film manufactured from the composition according to the invention.

Definitions

In the present application and claims the following terms and expressions have the meanings as defined below.

"Cellulose based" is defined as comprising polymers obtained from fibers derived from cellulose containing material. The polymers obtained from fibers derived from cellulose containing material are thus biopolymers. The cellulose based polymers are typically derivatives, such as ethers or esters of cellulose. The cellulose containing material can be obtained from various raw materials, for example wood, bark or leaves of plants, or from a plant-based material.

"Cellulose acetate butyrate" (CAB) polymer and "cellulose acetate propionate" (CAP) polymer are cellulose derivatives. They are produced by esterification of some hydroxyl groups in the cellulose polymer chain on the repeating glucose units. Cellulose acetate butyrate/propionate are used as binders and additives in coatings applications for a variety of substrates. These products offer a wide range of properties based on their butyryl/propyl, acetyl and hydroxy contents.

"Ethyl cellulose" (EC) polymer is another derivative of cellulose. Some of the hydroxyl groups in the cellulose polymer chain on the repeating glucose units have been converted into ethyl ether groups. Ethyl cellulose is mainly used in industrial applications such as in thin-film, but some grades can also be used in regulated markets such as food and pharmaceuticals. The number of ethyl groups may vary depending on the manufacturing process and give various properties to the material.

"Tall oil fatty acid ester" or TOFA ester is an ester of tall oil fatty acids. Typically, tall oil fatty acid methyl ester is used.

"Packaging film" may be for example cling film, shrink film, stretch film, bag film or container liners, films meant for consumer packaging (e.g. packaging film for frozen products, shrink film for transport packaging, food wrap film, packaging bags, or form, fill and seal packaging film), laminating film (e.g. laminating of aluminum or paper used for packaging for example milk or coffee), barrier film (e.g. film acting as an aroma or oxygen barrier used for packaging food, e.g. cold meats and cheese), films for the packaging of medical products, agricultural film (e.g. greenhouse film, crop forcing film, silage film, silage stretch film) or for applications in packaging cosmetics.

"Blow film process" or "film blowing process" or "blow film extrusion" is one of the most common methods of film manufacture. The blown film process is also sometimes referred to as the tubular film extrusion. The process involves extrusion of a plastic through a circular die, followed by "bubble-like" expansion.

DETAILED DESCRIPTION OF THE INVENTION

The present invention concerns a cellulose based composition for manufacturing a film or foil, which is environmentally friendly since it can be made out of renewable resources. The new composition can be formed into a packing material or packing film and it can be used for wrapping and packing to replace commonly used fossil plastic materials, which are based on e.g. polyethylene or polypropylene. The new composition comprises a mixture of at least one of the polymers selected from the group consisting of cellulose acetate butyrate, cellulose acetate propionate and ethyl cellulose, and also tall oil fatty acid ester, which are all derived from renewable resources. The new composition is suitably an environmentally friendly bioplastic material.

The present invention concerns a cellulose based composition for manufacturing a film or foil, which composition comprises at least one of the polymers selected from the group consisting of cellulose acetate butyrate, cellulose acetate propionate and ethyl cellulose. In addition to one or more of these polymers, the composition comprises tall oil fatty acid ester. The molar mass of at least one of the polymers selected from the group consisting of cellulose acetate butyrate, cellulose acetate propionate and ethyl cellulose is above 20,000 Da.

According to one embodiment of the invention, the cellulose based composition for manufacturing a film or foil consists of at least one of the polymers selected from the group consisting of cellulose acetate butyrate, cellulose acetate propionate and ethyl cellulose, and tall oil fatty acid ester, and optionally additives such as softeners, pigments, or other additives for use in plastic compositions. The molar mass of at least one of the polymers selected from the group consisting of cellulose acetate butyrate, cellulose acetate propionate and ethyl cellulose is above 20,000 Da.

In the cellulose based composition according to the present invention, the total amount of said at least one polymer selected from the group consisting of cellulose acetate butyrate, cellulose acetate propionate and ethyl cellulose is at least 40 weight-%, preferably at least 50 weight-%, more preferably at least 60 weight-% or at least 70 weight-%, based on the total weight of the composition. According to one embodiment, the total amount of the at least one polymer may be 40 to 95 weight-%, or for example 50 to 90 weight-% or 60 to 70 weight-%, based on the total amount of the composition.

The composition according to the invention may comprise cellulose acetate butyrate in an amount of 0 to 90 weight-%, preferably 10 to 80 weight-%, and/or cellulose acetate propionate in an amount of 0 to 90 weight-%, preferably 10 to 80 weight-%, and/or ethyl cellulose in an amount of 0 to 90 weight-%, preferably 10 to 80 weight-%, and tall oil fatty acid ester in an amount of 5 to 50 weight-%, preferably 10 to 45 weight-%. The amount of tall oil fatty acid ester in the composition according to the invention may thus be for example 5 to 50 weight-%, 10 to 45 weight-%, 15 to 35 weight-%, 20 to 30 weight-% or 30 to 40 weight-% based on the total weight of the composition.

According to one embodiment of the invention, the cellulose based composition comprises cellulose acetate butyrate in an amount of 10 to 90 weight-%, preferably 40 to 80 weight-%, cellulose acetate propionate in an amount of 0 to 50 weight-%, ethyl cellulose in an amount of 0 to 40 weight-%, and tall oil fatty acid ester in an amount of 10 to 50 weight-%, based on the total weight of the composition.

The composition according to the invention may for example comprise 50 to 75 weight-%, or 60 to 70 weight-% cellulose acetate butyrate based on the total weight of the composition.

Suitably, the molar mass of at least one of the polymers selected from the group consisting of cellulose acetate butyrate, cellulose acetate propionate and ethyl cellulose, is above 20,000 Da. Suitably, the molar mass of at least one of the polymers selected from said group is between 20,000 to 95,000 Da, preferably 20,000 to 90,000 Da, for example between 30,000 to 70,000 Da. If the molar masses of all components are too low, there is a risk that the composition will not be suitable for blow film processing, because the material will not be strong or resilient enough for the blow film process. Thus, the specified molar mass values enable using the polymers in blow film applications. Blow film processing enables forming a film or foil, preferably with clingy properties, suitable as a packing material.

Different grades of cellulose acetate butyrate, cellulose acetate propionate and ethyl cellulose are commercially available from several suppliers. In the composition according to the invention, the mixture of the polymer raw materials affects the properties of the formed film or foil. In other words, in case of a mixture of several polymers, the combined properties of the polymers need to be evaluated when forming the composition according to the invention. For example, if one of the polymers has a high molar mass, such as 90,000 Da or 70,000 Da, it could be suitable to combine this polymer with another polymer having a lower molar mass. Alternatively, or additionally, a higher amount of softener is needed for polymers with a high molar mass. The molar mass measurements may be performed with size exclusion chromatography (SEC), which was used in tests performed in connection with the present invention (see Examples 2). Suitable SEC measurement conditions are in chloroform eluent (0.6 ml/min, T=30° C.) using Styragel HR 4 and 3 columns with a pre-column. The elution curves may be detected using Waters 2414 Refractive index detector. The molar mass distributions (MMD) may be calculated against 10×PS (580-3040000 g/mol) standards, using Waters Empower 3 software. In Example 2, PS was used as standard. In comparative tests, the PS standard gave slightly higher results than the molar mass values provided by the manufacturer (Example 1). Thus, if a CAP standard would have been available in Example 2, the molar mass values of Example 2 would be slightly lower. Consequently, according to one embodiment, the molar mass of at least one of the polymers selected from the group consisting of cellulose acetate butyrate, cellulose acetate propionate and ethyl cellulose, is 25,000 to 95,000 Da measured with size exclusion chromatography (SEC) in chloroform eluent (0.6 ml/min, T=30° C.) using Styragel HR 4 and 3 columns with a pre-column, detecting elution curves using Waters 2414 Refractive index detector, and calculating molar mass distributions (MMD) against 10×PS (580-3040000 g/mol) standards, using Waters Empower 3 software.

The cellulose acetate butyrate, cellulose acetate propionate and/or ethyl cellulose polymers of the composition according to the present invention are suitably thermoplastic polymers. To be suitable for use in a packaging film, the cellulose based polymers used in the composition of the present invention should not be water-soluble. Thus, the polymers selected from the group consisting of cellulose acetate butyrate, cellulose acetate propionate and ethyl cellulose, are suitably not soluble in water. In addition, the polymers need to be suitable for use with a tall oil fatty acid ester softener. The cellulose acetate butyrate, cellulose acetate propionate and/or ethyl cellulose polymers of the composition according to the present invention have been found to fulfil these requirements. In addition, they are suitable for use in a composition, which can be used to produce a film or foil with clingy properties. Thus, according to one aspect, the polymers used in the composition of the present invention are cellulose based polymers, selected from the group consisting of cellulose acetate butyrate, cellulose acetate propionate and ethyl cellulose, wherein said polymers are thermoplastic and non-water-soluble. There may exist other cellulose based polymers, which have similar properties as cellulose acetate butyrate, cellulose acetate propionate or ethyl cellulose, and which also are suitable for the composition according to the inventions. Thus, the composition according to the invention may comprise also other cellulose based polymers.

According to one embodiment, the cellulose based composition of the present invention comprises at least two of the polymers selected from the group consisting of cellulose acetate butyrate, cellulose acetate propionate and ethyl cellulose, together with tall oil fatty acid ester. According to one embodiment, the cellulose based composition of the present invention comprises cellulose acetate butyrate and tall oil fatty acid methyl ester.

The cellulose based composition according to the invention also comprises tall oil fatty acid ester. Tall oil fatty acid ester is used in the composition of the present invention as a softener or plasticizer. Tall oil fatty acid has the advantage that it is a wood based composition, i.e. it is manufactured from renewable resources. A further advantage for some applications of the packaging film according to the invention, is that food grade TOFA esters are commercially available. For example, if used for packaging food. According to one embodiment of the invention, the tall oil fatty acid ester is tall oil fatty acid methyl ester. Tall oil fatty acid methyl ester is commercially available, and thus an advantageous alternative, since it does not need to be prepared separately.

The cellulose based composition according to the invention may also comprise at least one other softener in addition to tall oil fatty acid ester.

According to one embodiment, the cellulose based composition according to the invention comprises at least one other polymer, preferably polybutylene succinate, in addition to said at least one polymer selected from the group consisting of cellulose acetate butyrate, cellulose acetate propionate and ethyl cellulose. Polybutylene succinate (PBS) is suitable to mix with the cellulose based polymers. Other possible polymers suitable to mix with the cellulose based polymers are polypropylene succinate (PPS), poly(butylene succinate-co-butylene adipate) (PBSA), polyhydroxybutyrate, poly(hexamethylene glutarate), poly(hexamethylene adipate), poly(ethylene succinate), poly(butylene glutarate), poly(butylene adipate), poly(ethylene glutarate), poly(ethylene adipate), poly(diethylene glutarate), poly(diethylene adipate), poly(diethylene succinate) or poly(hexamethylene succinate).

According to one embodiment the total amount of all polymers in the composition according to the invention is 60 to 95 weight-% based on the total weight of the composition.

In addition, the composition of the present invention may contain pigments. The pigments are preferably white pigments. The white pigment may be for example titanium dioxide ($TiO_2$). Adding white pigment to the composition makes the formed film or foil material white and semi-transparent. This has an advantage especially when the packaging film according to the invention is used for packing food, because the white color makes the food inside the package look more attractive to the consumer. Without white pigment the film or foil material manufactured from the composition according to the invention may have a slight yellowish color. Thus, the white pigment has the effect of masking the natural color of the film or foil, which otherwise could make food products look less attractive to the consumer.

Apart from pigments, the composition according to the present invention may also comprise other components, such as additives typically used in plastics. These additives are for example fillers, aids or other agents. Typically, the amounts of these additives vary between 0.01 to 10 weight-% based on the weight of the composition. The amount of one additive may for example be 0.1 to 5 weight-% based on the weight of the composition.

One aspect of the present invention is a cellulose based composition for manufacturing a film or foil that does not contain any components which are based on fossil raw materials. In other words, in that case the composition may consist essentially or entirely of renewable raw materials.

The present invention also relates to a packaging film, which comprises the cellulose based composition according to the invention. The packaging film according to the invention may be manufactured using a film blowing process (blow film extrusion).

According to one embodiment, the composition for manufacturing a film or foil according to the invention may be processed into a film using either blow film extrusion (film blowing process) or cast film extrusion.

According to one embodiment the cellulose based composition is biodegradable. The new packaging film or foil manufactured from the cellulose based composition may also be biodegradable.

The cellulose based composition may also be mixed with conventional plastic raw materials, such as polyethylene or polypropylene. This way a composition suitable for manufacturing a film or foil material having certain advantageous characteristics may be obtained. The choice of raw material blend depends on the requirements and end use of the film or foil material.

According to one embodiment of the invention, the cellulose based composition for manufacturing a film or foil is formed into a cling film, which can be used to replace common cling films made from e.g. LDPE. Such cling film can be made from food grade raw materials. Thus, the cling film can be used to pack or wrap food products.

The present invention also relates to a method for manufacturing a film or foil. The method according to the invention for manufacturing a film or foil comprises the following steps:
  a. melt mixing a composition comprising at least one of the polymers selected from the group consisting of cellulose acetate butyrate, cellulose acetate propionate and ethyl cellulose, and tall oil fatty acid ester, to obtain a homogenous mixture, wherein optionally, tall oil fatty acid ester is added to the polymer(s) in at least two steps,
  b. granulating the homogenous mixture to obtain a granulated raw material, and
  c. producing a film or foil material from said granulated raw material.

According to one embodiment, the composition in step a. is the cellulose based composition according to the invention as described above.

According to one embodiment, step c. of the method according to the invention involves producing a film or foil material from the granulated raw material by using a film blowing process.

Preferably, in the melt-mixing step of the method, the tall oil fatty acid ester is added to the composition comprising at least one of the polymers selected from the group consisting of cellulose acetate butyrate, cellulose acetate propionate and ethyl cellulose, gradually and/or in at least two steps. The inventors of the present invention have found that the melt-mixing step can be made more efficient in this way. Otherwise, it may be difficult to obtain a homogenous mixture. According to one embodiment, the tall oil fatty acid ester is added to the composition comprising at least one of the polymers selected from the group consisting of cellulose acetate butyrate, cellulose acetate propionate and ethyl cellulose, in several steps, such as at least three separate steps, or at least four separate steps.

The melt mixing may be done in a continuous compounding process. The melt mixing is suitably carried out with a two-screw compounder. When using a compounder, the addition of tall oil fatty acid ester to the composition comprising at least one of the polymers selected from the group consisting of cellulose acetate butyrate, cellulose acetate propionate and ethyl cellulose, may be done from several stages or points.

The melt mixing may also be performed in a batch mixer.

Optionally the method may comprise premixing or impregnation steps for some of the components of the mixture to be formed in step a.

Standard tests known to the person skilled in the art can be made to ensure that the obtained mixture of step a. is suitable for blow film processing. The composition of the present invention needs to fulfil these requirements.

The composition according to the invention can be processed in conventional apparatuses for blow film processing. The requirements of the raw material and adjusting other parameters are known to a person skilled in the art.

The properties of the film or foil, or packaging material manufactured from the composition according to the invention, such as thickness, density, etc., need to be adjusted so that they are suitable for their intended use or application.

Furthermore, standard tests exist to ensure that plastic wrap or packaging film is effective. Some of the important tests are for example permeability (water vapor and gas), impact resistance, water absorption, and tear strength. The formed packaging film or foil needs to fulfil certain specific requirements depending on the intended applications, such as use for packaging food.

The present invention also concerns use of the cellulose based composition according to the invention for the manufacture of a packaging film. Preferably, the use concerns manufacture of a packaging film using a film blowing process.

Furthermore, the present invention concerns use of the cellulose based composition according to the invention in a film blowing process.

The new composition according to the invention may contain essentially only raw materials from renewable sources. The new composition may consist entirely of raw materials from renewable sources. The new composition may also consist entirely of biodegradable raw materials from renewable sources. The composition according to the invention is suitable for blow film processing.

There are many problems associated with commonly used LDPE cling film for packaging. One problem is that typically, only a few percent of LDPE is recycled. In fact, flexible plastic packaging materials are often not accepted in recycling programs at all. Introducing an environmentally friendly alternative to plastic wrap, such as the can be achieved with the composition according to the invention, is therefore a true advantage in the goal of achieving a sustainable development. Suitably, the cellulose based composition according to the invention also provides a high-quality film material to replace commonly used cling films.

An important advantage with the composition according to the invention, is that the film or foil manufactured therefrom can be produced using existing manufacturing processes and technology. Thus, it is an economically feasible alternative, since no major investments need to be made in new manufacturing equipment.

Further advantages related to the packaging material manufactured from the composition according to the invention are that plastic waste is reduced, since the composition may be degradable. Furthermore, use of fossil raw material can be reduced, since the composition according to the invention can be made of 100% renewable resources. Also, since the composition according to the invention is composed of wood, production does not occupy arable land.

The invention is further illustrated by the following example.

Example 1

The cellulose based composition according to the invention was formed into plastic films by using a film blowing process.

Details regarding the compositions and films can be seen in table 1.

TABLE 1

Films manufactured from the cellulose based composition according to the invention.

| Film No. | weight-% CAB (70 kDa) | weight-% CAB (30 kDa) | weight-% TOFA ester (methyl ester) | Processing temperature (° C.) |
|---|---|---|---|---|
| 1 | 0 | 70 | 30 | 140-170 |
| 2 | 60 | 0 | 40 | 170 |

In table 1, CAB is cellulose acetate butyrate, and TOFA ester is tall oil fatty acid methyl ester.

The molar mass (kDa) values are based on information given by the manufacturer.

Water absorption tests were made to the films by immersing film samples into water for several days. No visible change to appearance or texture was noted in the films after immersing in water.

The films 1-2 were transparent and had clingy properties as can be seen in FIG. 1, wherein one of the films is wrapped around a ceramic coffee cup and it sticks to the cup. Thus, the film is suitable for use as a packaging film, such as a plastic wrap.

Example 2

The cellulose based composition according to the invention was formed into plastic films using a film blowing process.

Details regarding the compositions and films can be seen in table 2.

TABLE 2

Films manufactured from the cellulose based composition according to the invention.

| Film No. | weight-% CAP | weight-% PBS | weight-% TEC | weight-% TOFA ester (methyl ester) | Processing temperature for melt mixing (° C.) |
|---|---|---|---|---|---|
| 3 | 55.8 | 37.2 | 2.3 | 4.7 | 210 |
| 4 | 55.6 | 37.0 | 1.9 | 5.5 | 210 |

In Table 2, CAP is cellulose acetate propionate, PBS is polybutylene succinate, TEC is triethyl citrate and TOFA ester is tall oil fatty acid methyl ester.

The films 3-4 were transparent and had clingy properties and were suitable for use as a packaging material, such as a plastic wrap.

TABLE 3

Molar mass SEC measurements of used CAP and PBS

| Entry | Compound | Mn g/mol | Mw g/mol | PD | Eluent/HPSEC system |
|---|---|---|---|---|---|
| a | CAP | 91 000 | 235 000 | 2.6 | Chloroform |
| b | PBS | 69 000 | 180 000 | 2.6 | Chloroform |

The molar mass measurements were performed with size exclusion chromatography (SEC) using chloroform eluent for the molar mass measurements, the samples (Entries a and b), were dissolved overnight using chloroform (concentration of 1 mg/ml). Samples was filtered (0.45 μm) before the measurement.

The SEC measurements were performed in chloroform eluent (0.6 ml/min, T=30° C.) using Styragel HR 4 and 3 columns with a pre-column. The elution curves were detected using Waters 2414 Refractive index detector. The molar mass distributions (MMD) were calculated against 10×PS (580-3040000 g/mol) standards, using Waters Empower 3 software. This method may vary from the results in Example 1 by giving slightly higher values.

Example 3

The cellulose based composition according to the invention was formed into plastic films using a film blowing process.

Details regarding the compositions and films can be seen in table 4.

TABLE 4

Films manufactured from the cellulose based composition according to the invention.

| Film No. | weight-% CAP | weight-% TOFA ester (methyl ester) | Processing temperature for melt mixing (° C.) |
|---|---|---|---|
| 5 | 85 | 15 | 210 |
| 6 | 90 | 10 | 210 |

In table 4, CAP is cellulose acetate propionate, and TOFA ester is tall oil fatty acid methyl ester.

The films 5-6 were transparent and had clingy properties. Thus, the film is suitable for use as a packaging film, such as a plastic wrap.

The invention claimed is:

1. A cellulose based composition for manufacturing a film or foil, comprising
   a. at least one polymer selected from the group consisting of cellulose acetate butyrate, cellulose acetate propionate, and ethyl cellulose, and
   b. tall oil fatty acid ester,
   wherein the molar mass of said at least one polymer is above 20,000 Da, and wherein said composition comprises
   cellulose acetate butyrate in an amount of 10 to 80 weight-%,
   cellulose acetate propionate in an amount of 10 to 80 weight-%,
   ethyl cellulose in an amount of 0 to 90 weight-%, and
   tall oil fatty acid ester in an amount of 5 to 50 weight-%, based on the total weight of the composition.

2. The cellulose based composition according to claim 1, wherein said composition comprises ethyl cellulose in an amount of 10 to 80 weight-%, and tall oil fatty acid ester in an amount of 10 to 45 weight-%.

3. The cellulose based composition according to claim 1, wherein said at least one polymer is thermoplastic and non-water-soluble.

4. The cellulose based composition according to claim 1, wherein a molar mass of the at least one polymer is 20,000 to 95,000 Da.

5. The cellulose based composition according to claim 4, wherein the molar mass of the at least one polymer is 30,000 to 70,000 Da.

6. The cellulose based composition according to claim 1, further comprising white pigment.

7. The cellulose based composition according to claim 6, wherein the white pigment comprises $TiO_2$.

8. The cellulose based composition according to claim 1, wherein said tall oil fatty acid ester is tall oil fatty acid methyl ester.

9. The cellulose based composition according to claim 1, further comprising at least one other polymer comprising polybutylene succinate (PBS), polypropylene succinate (PPS), poly(butylene succinate-co-butylene adipate) (PBSA), polyhydroxybutyrate, poly(hexamethylene glutarate), poly(hexamethylene adipate), poly(ethylene succinate), poly(butylene glutarate), poly(butylene adipate), poly(ethylene glutarate), poly(ethylene adipate), poly(diethylene glutarate), poly(diethylene adipate), poly(diethylene succinate), or poly(hexamethylene succinate).

10. The cellulose based composition according to claim 9, wherein the at least one other polymer comprises polybutylene succinate (PBS).

11. The cellulose based composition according to claim 1, wherein said composition comprises ethyl cellulose in an amount of 10 to 80 weight-%, and tall oil fatty acid ester in an amount of 10 to 45 weight-%.

12. A packaging film, comprising the cellulose based composition according to claim 3, wherein the packaging film is manufactured using a film blowing process.

13. A method for manufacturing a film or foil, comprising the following steps:
   a. melt mixing the composition of claim 1 to obtain a homogenous mixture,
   b. granulating the homogenous mixture to obtain a granulated raw material, and
   c. producing a film or foil material from said granulated raw material.

14. The method according to claim 13, wherein producing a film or foil material from said granulated raw material comprises using a film blowing process.

15. The method of claim 13, wherein the tall oil fatty acid ester is added to the at least one polymer in at least two steps.

16. A cellulose based composition for manufacturing a film or foil, comprising
   a. at least one polymer selected from the group consisting of cellulose acetate butyrate, cellulose acetate propionate, and ethyl cellulose, and
   b. tall oil fatty acid ester,
   wherein the molar mass of said at least one polymer is above 20,000 Da,
   wherein the total amount of said at least one polymer is at least 60 weight-% based on the total weight of the composition, and
   wherein said composition comprises
   cellulose acetate butyrate in an amount of 10 to 80 weight-%,
   cellulose acetate propionate in an amount of 10 to 80 weight-%,
   ethyl cellulose in an amount of 0 to 90 weight-%, and
   tall oil fatty acid ester in an amount of 5 to 50 weight-%, based on the total weight of the composition.

17. The cellulose based composition according to claim 16, wherein the total amount of said at least one polymer is at least 70 weight-%, based on the total weight of the composition.

18. The cellulose based composition according to claim 16, wherein said composition comprises cellulose acetate butyrate in an amount of 40 to 80 weight-% and tall oil fatty acid ester in an amount of 10 to 50 weight-%, based on the total weight of the composition.

* * * * *